(12) United States Patent
Takahashi et al.

(10) Patent No.: US 8,141,736 B2
(45) Date of Patent: Mar. 27, 2012

(54) FILLER CAP TETHER

(75) Inventors: Ryo Takahashi, Atsugi (JP); Shelley Ross Edward, Sagamihara (JP); Kensuke Ogose, Sagamihara (JP)

(73) Assignee: NIFCO Inc., Yokohama-Shi, Kanagawa (JP)

( * ) Notice: Subject to any disclaimer, the term of this patent is extended or adjusted under 35 U.S.C. 154(b) by 0 days.

(21) Appl. No.: 12/733,228

(22) PCT Filed: Aug. 19, 2008

(86) PCT No.: PCT/JP2008/064725
§ 371 (c)(1),
(2), (4) Date: Apr. 22, 2010

(87) PCT Pub. No.: WO2009/025263
PCT Pub. Date: Feb. 26, 2009

(65) Prior Publication Data
US 2010/0237650 A1  Sep. 23, 2010

(30) Foreign Application Priority Data
Aug. 21, 2007 (JP) ................. 2007-214990

(51) Int. Cl.
*B65D 55/16* (2006.01)
*B65D 53/02* (2006.01)
(52) U.S. Cl. ............................ 220/375; 220/86.2
(58) Field of Classification Search .............. 220/375, 220/86.2, DIG. 33; 215/306
See application file for complete search history.

(56) References Cited

U.S. PATENT DOCUMENTS

| 6,237,798 | B1 * | 5/2001 | Sung .............................. 220/375 |
| 6,332,553 | B1 * | 12/2001 | Yamada et al. ............... 220/375 |
| 2003/0024931 | A1 * | 2/2003 | Bae ................................ 220/375 |
| 2005/0051557 | A1 | 3/2005 | Hagano |
| 2005/0092752 | A1 * | 5/2005 | Hagano et al. ................ 220/375 |
| 2005/0167432 | A1 * | 8/2005 | Gerdes ........................... 220/375 |
| 2007/0045322 | A1 * | 3/2007 | Hagano et al. ................ 220/375 |
| 2008/0000909 | A1 * | 1/2008 | Hagano et al. ................ 220/375 |
| 2008/0073352 | A1 * | 3/2008 | Hagano et al. ................ 220/375 |

FOREIGN PATENT DOCUMENTS

| EP | 1 512 574 A2 | 3/2005 |
| JP | H10-211821 | 8/1998 |
| JP | 2003-011681 | 1/2003 |
| JP | 2004-066901 | 3/2004 |
| JP | 2004-291987 | 10/2004 |
| JP | 2005-088825 | 4/2005 |
| JP | 2005-193796 | 7/2005 |
| JP | 2006-248459 | 9/2006 |
| JP | 2006-315750 | 11/2006 |
| JP | 2007-062763 | 3/2007 |

\* cited by examiner

*Primary Examiner* — Mickey Yu
*Assistant Examiner* — Niki Eloshway
(74) *Attorney, Agent, or Firm* — Manabu Kanesaka

(57) ABSTRACT

A filler cap tether includes attachment portions on both ends of a string-like member, of which one end-side attachment portion is connected to a filler cap to be removably mounted on an oil feeding port whereas the other end-side attachment portion is connected to the vehicle body-side corresponding portion. The filler cap tether includes a disengagement portion for permitting the filler cap and the vehicle body-side corresponding portion to enter into a disconnected state when a load with a predetermined value or above is applied.

6 Claims, 9 Drawing Sheets

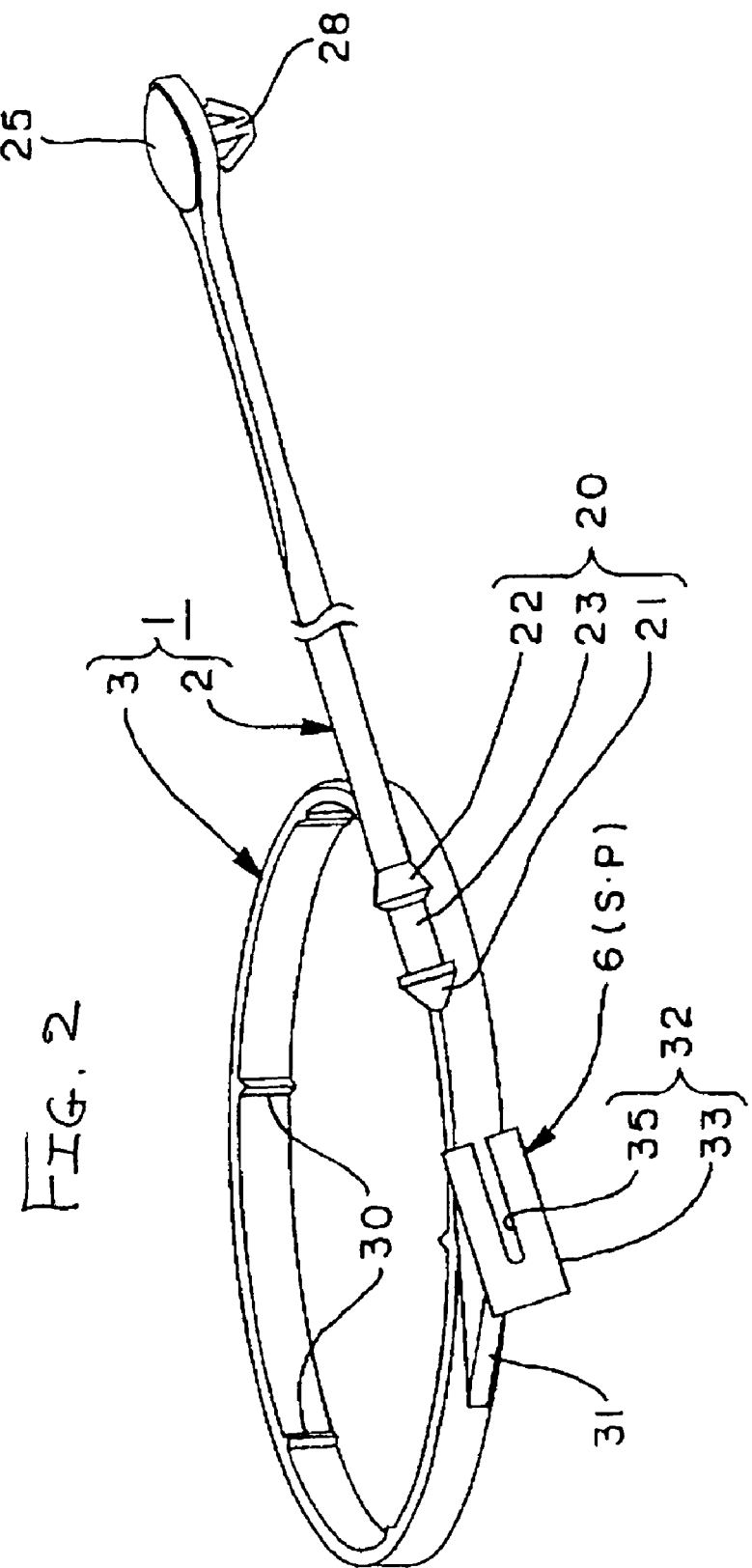

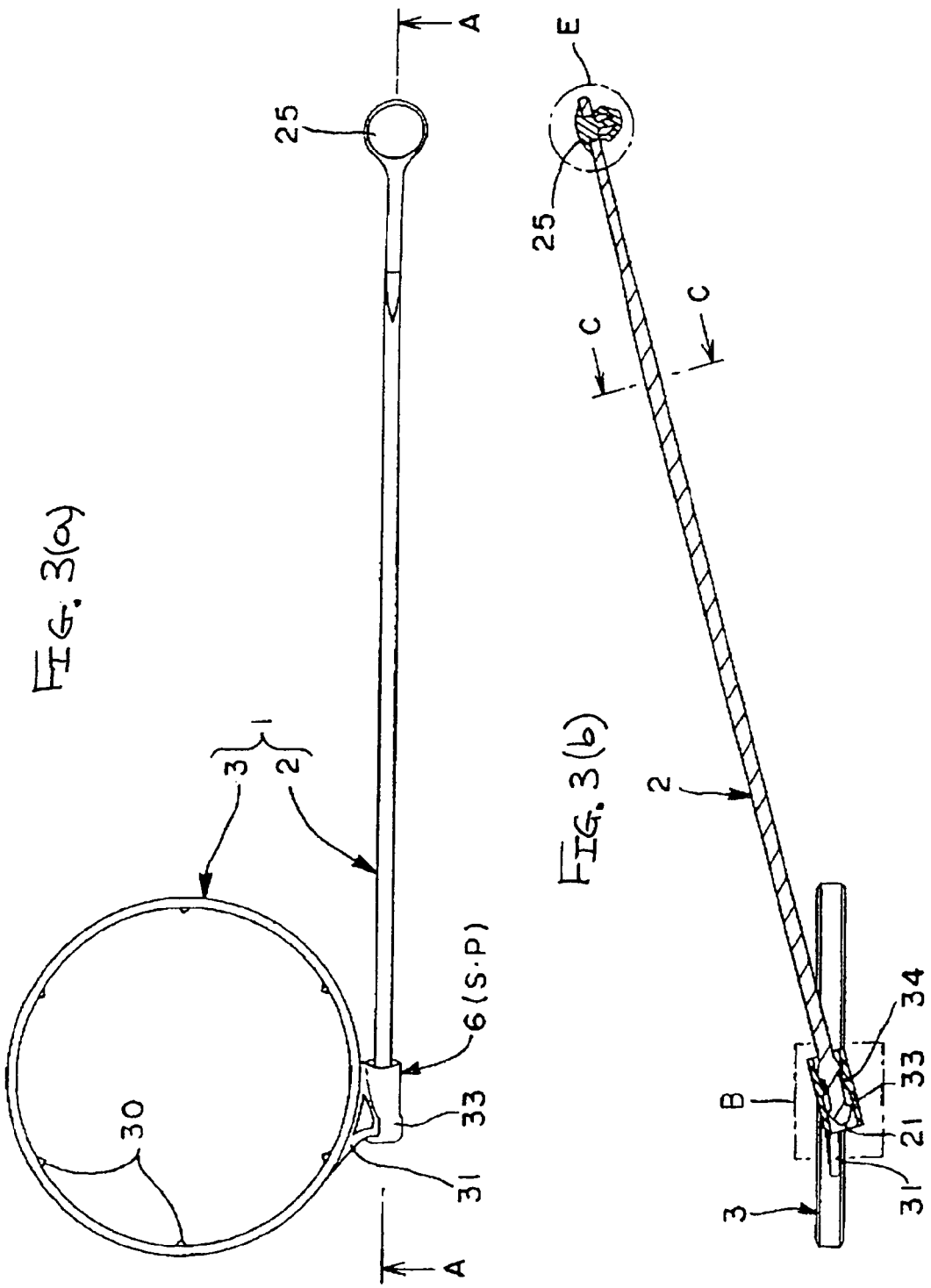

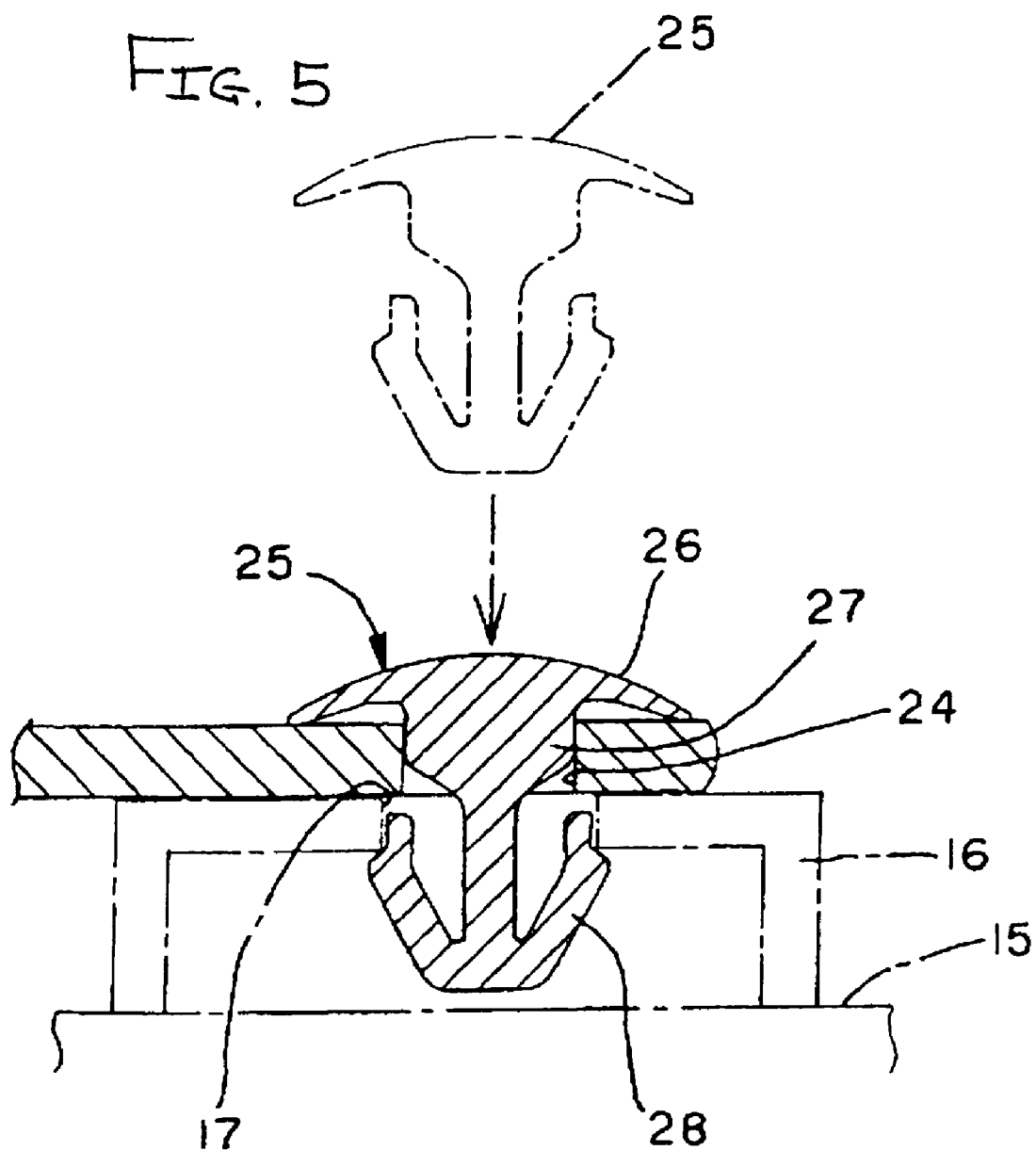

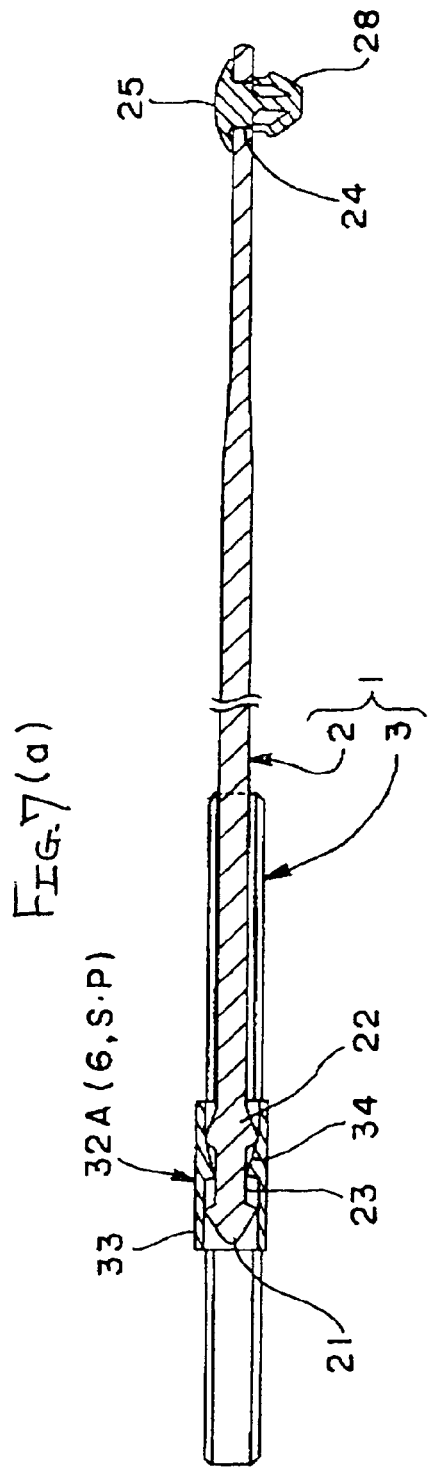
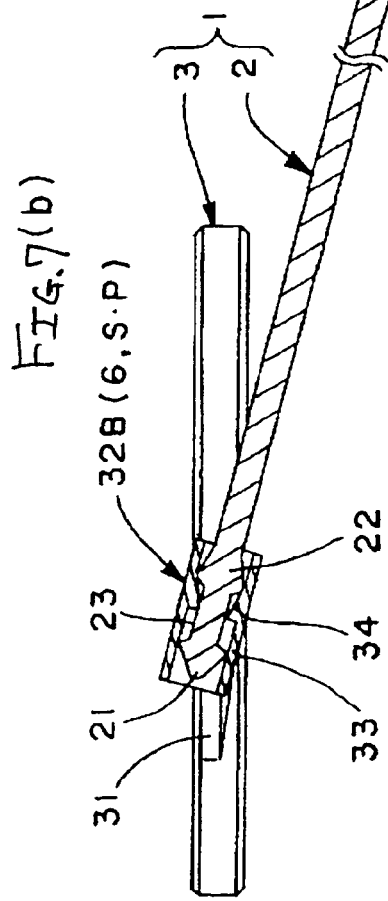

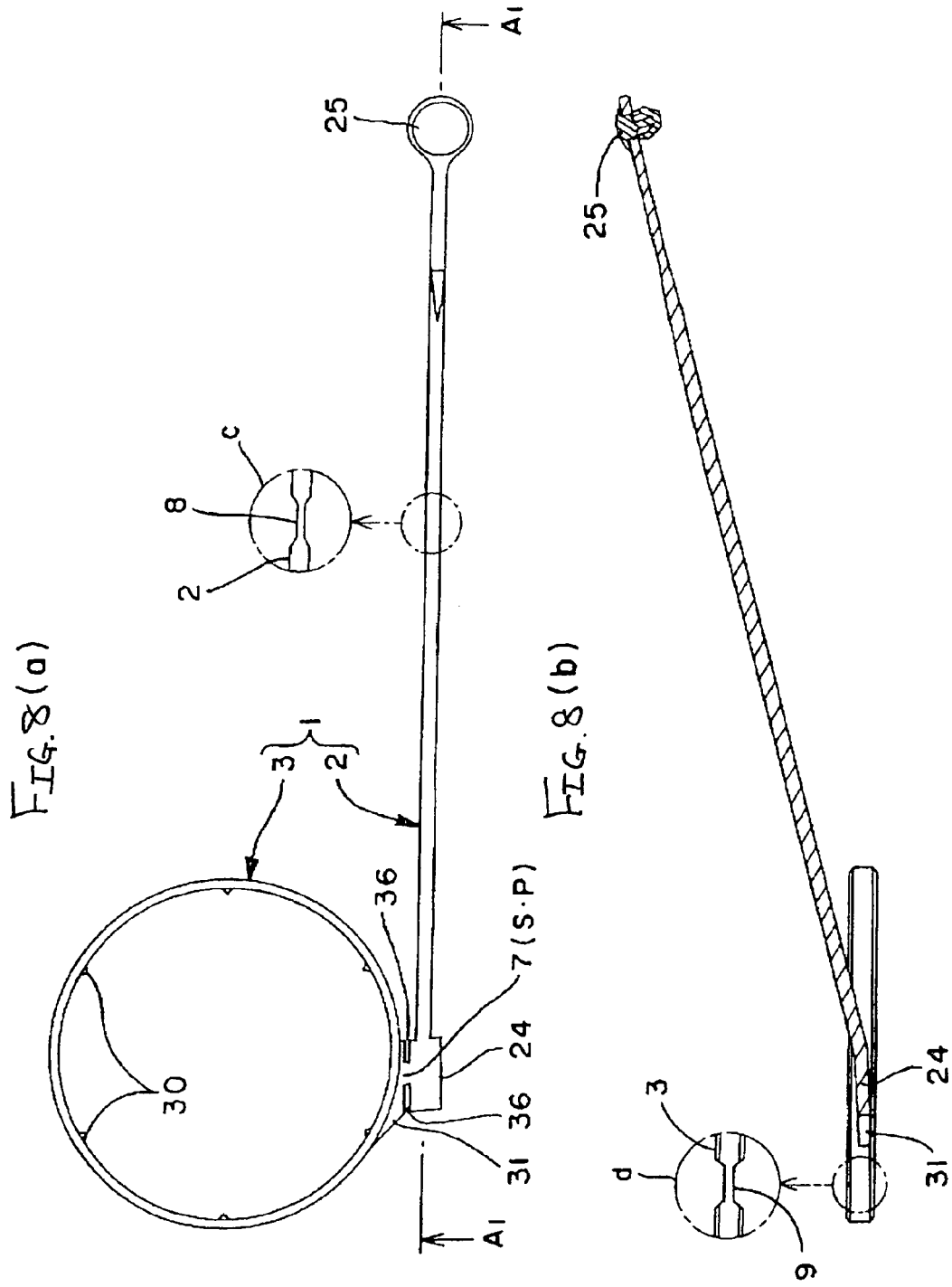

FILLER CAP TETHER

FIELD OF THE INVENTION

This invention relates to a filler cap tether which is suitable for supporting a filler cap removably mounted on a fuel oil feeding port for a vehicle and which prevents misplacement of the filler cap during fueling and the like.

BACKGROUND OF THE ART

A filler cap tether of the subject prevents the loss of a cap removed from an oil feeding port while fueling in a state wherein one end side is connected to a filler cap (hereinafter, abbreviated as a cap) which is removably mounted on the oil feeding port on a vehicle body side, and the other end side is connected to a vehicle body-side corresponding portion. As exemplified in the Japanese Patent Document 1 or 2, various improved products are proposed.

FIG. 9(a) is disclosed in the Japanese Patent Document 1, the reference numeral 120 represents the cap mounted on the oil feeding port inside a vehicle body-side concave portion, and the reference numeral 130 represents a tether mechanism disposed between the cap 120 and the vehicle body-side corresponding portion. The tether mechanism 130 is provided with a rotational ring 132 rotatably mounted on a groove-like ring mounted portion 125 on the outer circumference of the cap; connecting members 136; and rotational connecting portions 139. The connecting members generally denoted by numeral 136, include a connecting member main body 136a; a first supporting end 137 provided in one end portion of the connecting member main body 136a and connected to the rotational ring 132; and a second supporting end connected to a fueling lid (outside lid) (not shown) which opens and closes the vehicle body-side concave portion wherein the oil feeding port is disposed. The rotational connecting portions 139 include a U-shaped connecting main body 139a, and the connecting member main body 136a is rotatably attached to the rotational ring 132 around on the axis of the longitudinal direction. Specifically, the characteristic of the mechanism is to improve operability so that the connecting members 136 are not twisted at the time of the rotational operation of the cap 120 through the rotational connecting portions 139.

FIG. 9(b) is disclosed in the Japanese Patent Document 2, the reference numeral 111 represents the cap mounted on the oil feeding port inside the vehicle body-side concave portion, and the reference numeral 171 is the tether. The cap 111 forms a handle portion 121 for grabbing; a circular groove portion 131 provided on the outer circumference of the lower side of the handle portion 121; and a threaded portion 141 for screwing into the oil feeding port. In the tether 171, one end portion is connected to a flap (outside lid) (not shown) opening and closing the vehicle body-side concave portion wherein the oil feeding port is disposed, and the other end portion is connected to a circular member 151 rotatably mounted on the handle portion-side circular groove portion through an angle control portion 117E. Specifically, in this structure, the circular member 151 includes an engagement piece 161 with a hole portion projecting from the outer circumference, and the other end portion of the tether 171 rotatably engages with the hole portion of the engagement piece 161 for only a predetermined angle (within a movable range in the same figure). As a result, regardless of the bending of the tether 171, the cap 111 can smoothly and continuously rotate relative to the circular member 151, and also a hinge starting position of the cap can be ensured by always constantly maintaining the positional relationship of the tether 171 and the cap 111.

Patent Document 1: Japanese Unexamined Patent Application Publication (TOKKAI) No. 2007-62763
Patent Document 2: Japanese Unexamined Patent Application Publication (TOKKAI) No. 2004-66901

DISCLOSURE OF THE INVENTION

Problems To Be Solved By the Invention

In the above-mentioned each structure, in the operation of removably mounting the cap at the time of fueling, the operability of the cap can be excellently maintained so that the tether is not be twisted accompanied with the rotation of the cap or be arbitrarily bent. However, a conventional tether is a relationship supporting the cap on a vehicle body side, and for example, due to a rear-end car accident and the like, if the vehicle body-side corresponding portion (outside lid for the concave portion, or near the concave portion) connecting one end side of the tether is forcibly removed or deformed, the cap includes a possibility of being rotated in an opening direction through the tether.

Therefore, an object of the present invention is to reliably prevent an element of being rotated in the opening direction through the tether in a sate wherein the cap is mounted by a simple structure.

Means For Solving the Problems

In order to achieve the above-mentioned object, the present invention is a filler cap tether which includes attachment portions on both ends of a string-like member, of which the one end-side attachment portion is connected to a filler cap to be removably mounted on an oil feeding port whereas the other end-side attachment portion is connected to the vehicle body-side corresponding portion. The filler cap tether includes a disengagement portion for enabling the filler cap and the vehicle body-side corresponding portion to assume a disconnected state when a load with a predetermined value or above is applied.

In the above-mentioned present invention, the oil feeding port is an opening supplying a fuel to a fuel tank, and disposed inside, for example, the vehicle body-side concave portion. The vehicle body-side corresponding portion is an outside lid which opens and closes the inner surface or a proximity portion of the concave portion, or the concave portion. Then, the disengagement portion of the present invention is set so that, when the vehicle body-side corresponding portion connecting one end side of the tether is forcibly removed or deformed, for example, due to a rear-end car accident and the like to allow the tether to pull the filler cap in an opening direction, the tether is divided into two by a force smaller than a force which rotates the cap in the opening direction from a mounted state.

Also, the above-mentioned invention is preferred to be realized as follows.

(1) A structure wherein a circular body rotatably mounted on the outer circumference of the filler cap is provided in the one end-side attachment portion, and also the circular body and the string-like member are connected by a connecting means.

(2) A structure wherein the connecting means combines with the disengagement portion, and also which comprises an engaging portion and an engaged portion provided in opposed portions of the circular body and the string-like member and mutually engaged and disengaged.

(3) A structure wherein the circular body rotatably mounted on the outer circumference of the filler cap is provided in the one end-side attachment portion, and also in the circular body or the string-like member, a breaking portion combining with the disengagement portion is formed.

(4) A structure wherein the engaging portion is an engaging portion with a male element provided in the string-like member, the engaged portion comprises a tube portion provided in the circular body, and also a slit extending from an insertion opening side wherein the engaging portion is inserted, is provided in the tube portion. In this case, the structure is that the slit of the tube portion is provided along an inserting direction of the engaging portion with the male element.

(5) A structure wherein the string-like member is attached with an angle at a tilt relative to the outer circumference of the circular body.

(6) A structure wherein the filler cap can be separated into upper and lower portions if a load with a predetermined value or above is applied in a cap axial direction, and also the circular body is mounted on an upper side portion among the upper and lower portions of the filler cap.

Effects of the Invention

In the present invention, in the mounted state of the filler cap, for example, due to a rear-end car accident and the like, if the vehicle body-side corresponding portion (outside lid or near the concave portion) connecting the one end side of the tether is forcibly removed or deformed, so that the tether tries to pull the filler cap in the opening direction, the tether is divided in two through the disengagement portion, so that the filler cap and the vehicle body side are brought into the disconnected state.

If the present invention is realized as above (1), in a state wherein the circular body is connected to the string-like member through the Connecting means, the circular body is relatively rotatably mounted on the filler cap, so that a problem in which the tether is twisted due to the rotational operation of the filler cap or caught in the circumference of the cap, can be solved. In this case, in the case wherein the present invention is realized as mentioned above (2), by setting so that the engagement is released due to a load with a predetermined value or above by the engaging portion and the engaged portion wherein the connecting means combines with the disengagement portion, i.e., for example, by a concave-convex engagement, the present invention can be used again and improve commodity value in addition to the above-mentioned effects, even if the tether is once divided into two.

If the present invention is realized as above (3), since the circular body is relatively rotatably mounted on the filler cap, the problem in which the tether is twisted by the rotational operation of the filler cap or caught in the circumference of the cap, can be solved. Additionally, due to the breaking portion which is the disengagement portion provided in the circular body or the string-like member, the effects of the present invention can be easily provided.

If the present invention is realized as described in the first half of the above (4), since the connecting means comprises the engaging portion with the male element on a string-like member side and the tube portion on a circular body side, the present invention is concise and can be easily molded. Moreover, due to the slit provided on a tube portion side, it is easy to set so as to be disengaged by the load with the predetermined value or above. In addition, if the present invention is realized as described in the latter half of the above (4), since the slit is provided along an inserting direction of the engaging portion with the male element, for example, as for load setting at the time of the disengagement, a setting value can be satisfied by, for example, the width or number of the slit.

If the present invention is realized as described in the above (5), and the string-like member is additionally provided on the outer circumference of the circular body with an angle at a tilt, when the string-like member is pulled, for example, due to a vehicle body deformation at the time of a rear-end car accident, the pulling force can be easily diverged in the axial direction and the rotational direction of the filler cap, so that the effect wherein unprepared opening of the filler cap can be controlled, can be provided.

If the present invention is realized as described in the above (6), and the filler cap receives the load with the predetermined value or above, the filler cap is divided in the upper part and the lower part near the attachment portion of the circular body. At the time of this separation, the lower side portion of the filler cap remains in a state fastened to the oil feeding port (filler neck). That is, in the above-mentioned structure, the pulling force applied in a cap rotational direction relative to the filler cap, can be responded by dividing the cap by the disengagement of the connecting means, or through the breaking portion which combines with the disengagement portion. Also, the pulling force applied in a cap axial direction relative to the filler cap, can be responded in all directions by dividing the cap itself into the upper side portion and the lower side portion.

BRIEF DESCRIPTION OF THE DRAWINGS

FIG. 2 is an exploded view showing a tether structure in FIG. 1.

FIG. 3(a) is a top view of the above-mentioned tether, and FIG. 3(b) is a sectional view taken along line A-A of FIG. 3(a).

FIG. 5 is an enlarged view of an E portion of FIG. 3(b).

FIGS. 7(a), 7(b) are views showing modified examples of the tether corresponding to FIG. 3(b).

FIGS. 8(a), 8(b) are views showing other modified examples of the tether corresponding to FIGS. 3(a), 3(b).

BEST MODE FOR CARRYING OUT THE INVENTION

Hereinafter, the best mode of the present invention will be explained with reference to figures. In this explanation, after a tether structure and operation of the present invention are explained with FIGS. 1 to 6, each modified example 1 to 3 of FIGS. 7(a), 7(b), 8(a), 8(b) will be described.

Figure 6:
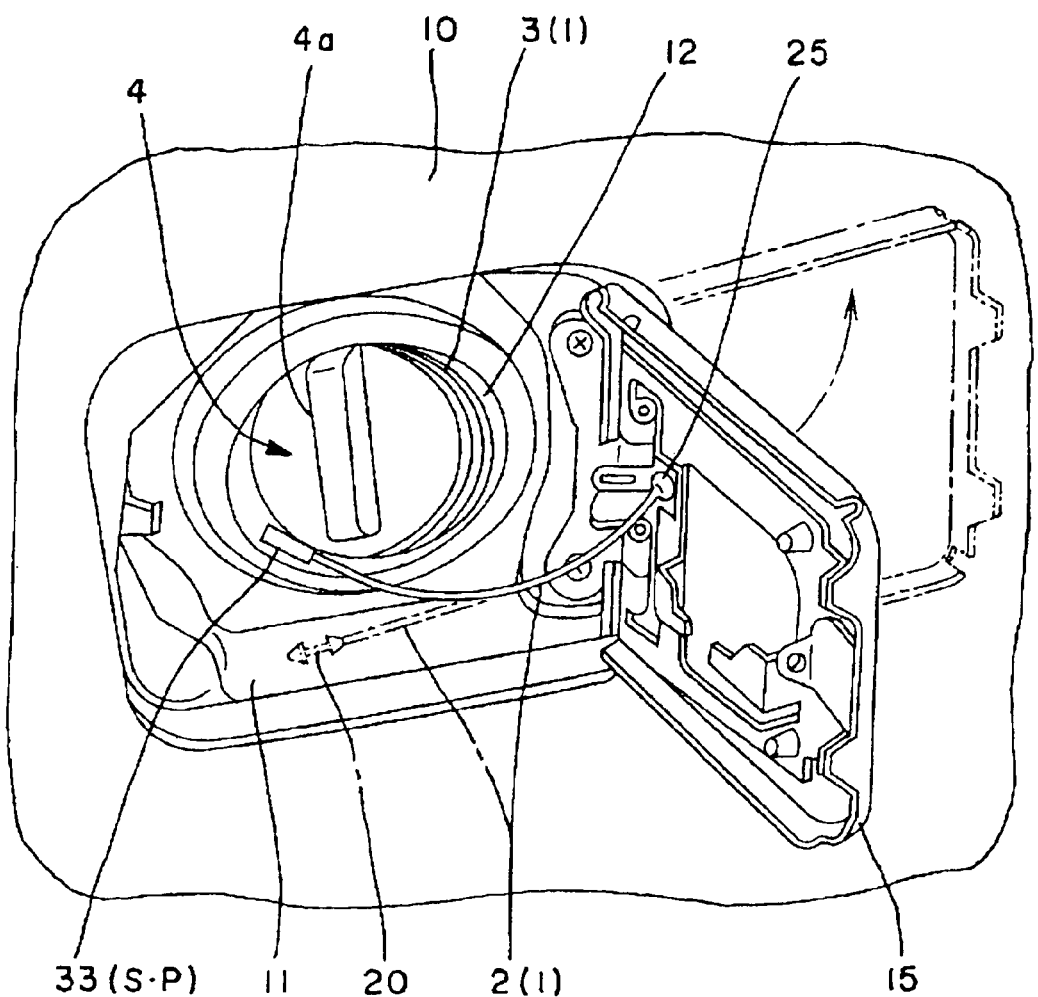
FIG. 6 is a schematic diagram showing a usage example of the tether.
Figure 9A:
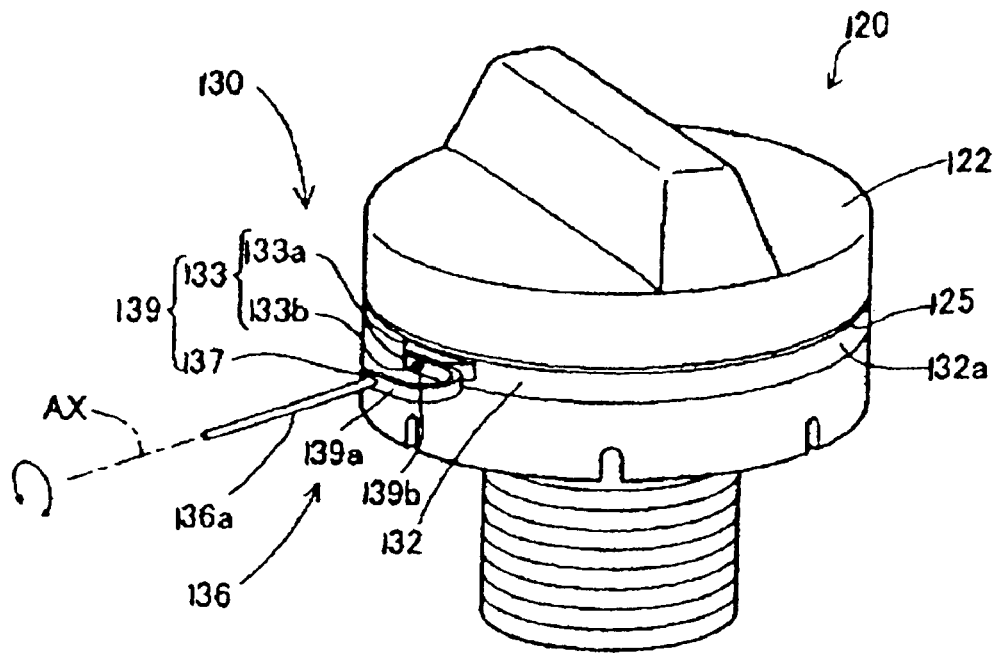
FIGS. 9(a), 9(b) are explanatory views showing structures of the Japanese Patent Documents 1 and 2.
Figure 9B:
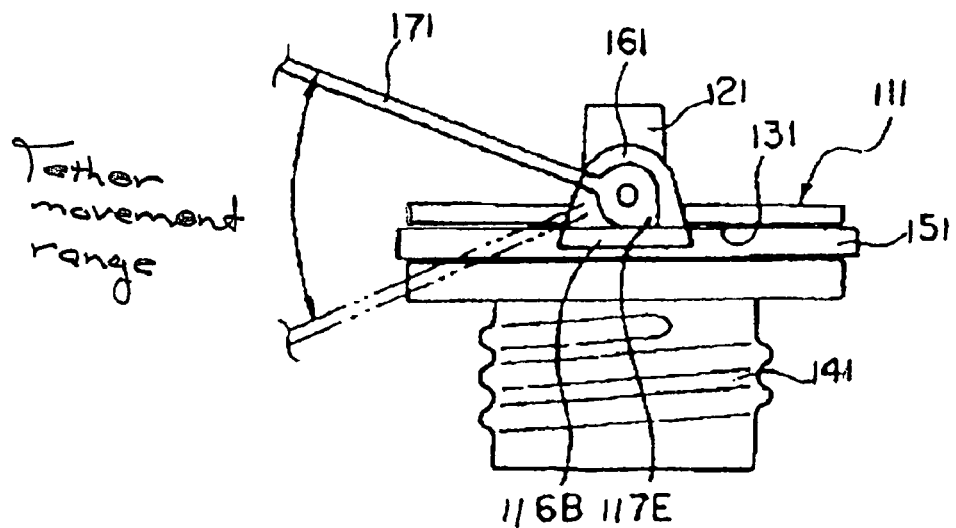

(Tether structure) A tether 1 of the mode is provided with, as shown in FIG. 6, a string-like member 2; a circular body 3 connected to one end side of the string-like member 2; and a disengagement portion S/P provided in the string-like member 2 or/and the circular body 3. Then, the tether 1 is connected to a filler cap 4 (hereinafter, abbreviated as a cap) wherein one end of the string-like member 2 is removably mounted on an oil feeding port 12 through the circular body 3 whereas the other end of the string-like member 3 is connected to an outside lid 15 which opens and closes a concave portion 11 through a clip 25. In the used state, when a load with a predetermined value or above is applied, the cap 4 and the outside lid 15 are divided through the disengagement portion S/P and bring them into a disconnected state. Hereinafter, the above will be explained in details.

First, the cap 4 of the subject, as the cap in the Japanese Patent Document 1 or 2, includes a convex-shaped operation portion 4a provided on the upper side; a male screw 4b provided on the lower side and hinged at a female screw on an oil feeding port side; and a circular groove 4c provided on the outer circumferential portion between the operation portion 4a and the male screw 4b. Also, the cap 4 is constituted to be dividable to upper and lower portions if the load with the predetermined value or above is applied in a cap axial direction. Specifically, if the load with the predetermined value or above is applied in the cap axial direction, the upper portion forming the operation portion 4a and the circular groove 4c, and the lower portion forming the Male screw 4b are divided. Also, the oil feeding port 12 is an opening supplying a fuel to a fuel tank, and disposed inside the concave portion 11 provided in a vehicle body 10 as for, for example, an automobile. The concave portion 11 is opened and closed by the outside lid 15 which is rotated through a hinge (not shown in the figures). The surface of the outside lid 15 in a closed state is disposed as one surface of the outside surface of the vehicle body 10, and the surface of the outside lid 15 in an open state exposes the cap 4 mounted on the oil feeding port 12.

The string-like member 2 and the circular body 3 are resin-molded products; however, materials besides resin may be used provided that the cap 4 can be supported in the vehicle body-side corresponding portion. In addition to an operation preventing the cap from losing, in the case wherein a static-electricity neutralization operation, flowing static electricity from the cap 4 to a vehicle body side, is provided, for example, a resin material provided with a conductive property is used as a conductive material. Also, the disengagement portion S/P is realized as a connecting means 6 connecting the string-like member 2 and the circular body 3 to be removably mountable.

The string-like member 2 has an approximately thin stick shape (a length of approximately 15 to 25 cm) as a whole, and includes engaging portions 20 with a male element formed in one end, and an attachment hole 24 formed in the other end. The engaging portions 20 comprise an end bulging portion 21, an insertion control portion 22, and a sliding axial portion 23 provided between the end bulging portion 21 and the insertion control portion 22. The end bulging portion 21 is formed in an approximately hemisphere with a round end. The insertion control portion 22 is bulged and formed while maintaining a predetermined space with the end bulging portion 21, and also formed in a shape so that as going to an end side, the diameter expands. The sliding axial portion 23 connects a large diameter-side end surface of the end bulging portion 21 and a large diameter-side end surface of the insertion control portion 22. On the other hand, the clip 25 is assembled to the attachment hole 24.

As shown in FIG. 5, the clip 25 is constituted by an upper flange portion 26 for an insertion control; a neck portion 27 provided under the center of the lower surface of the upper flange portion 26 and fitted into the attachment hole 24; and an anchor-like engagement leg portion 28 provided on the lower side of the neck portion 27. Then, if the engagement leg portion 28 is penetrated into the attachment hole 24 accompanied with a deformation, the clip 25 is restored to an original anchor shape after the penetration, and assembled as shown in the same figure. The tether 1 in FIGS. 1 to 3(b) is shown in a state wherein the clip 25 is assembled to the attachment hole 24 in that manner.

The circular body 3 includes a plurality of longitudinal ribs 30 whose inner diameter corresponds to the circular groove 4c on a cap side and which is projected from portions equally divided in the inner circumference. As shown in FIGS. 1 to 3(b), the circular body 3 is relatively rotatably mounted on the circular groove 4c. Also, on the outer circumference of the circular body 3, engaged portions 32 are provided through a joint portion 31. The engaged portions 32 comprise the connecting means 6 which is the above-mentioned disengagement portion S/P with the engaging portions 20.

Figure 4A:
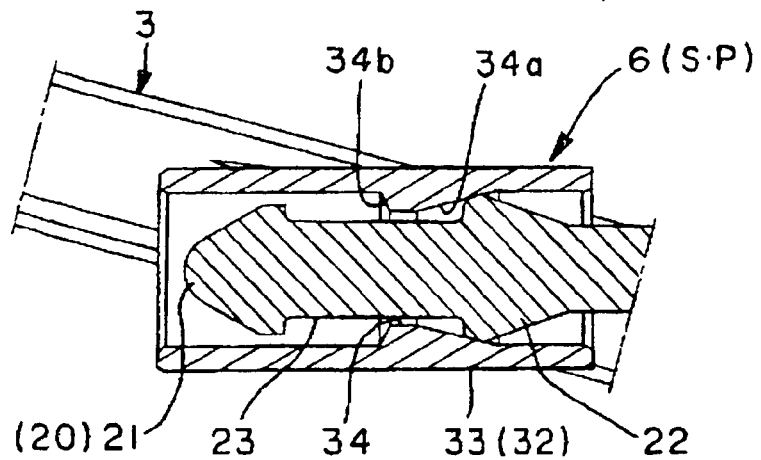
FIG. 4(a) is an enlarged view of a B portion of FIG. 3(b)
Figure 4B:
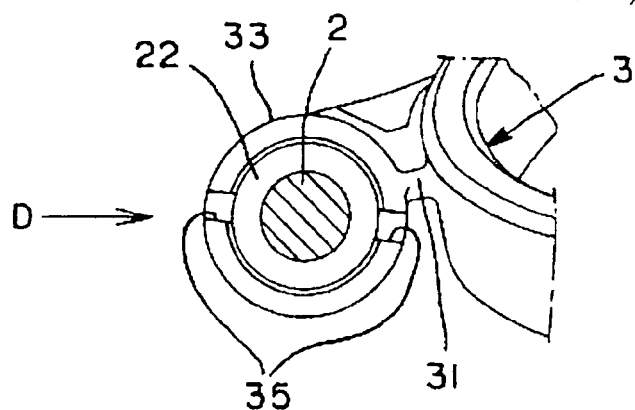
FIG. 4(b) is a sectional view taken along line C-C of FIG. 3(b)
Figure 4C:
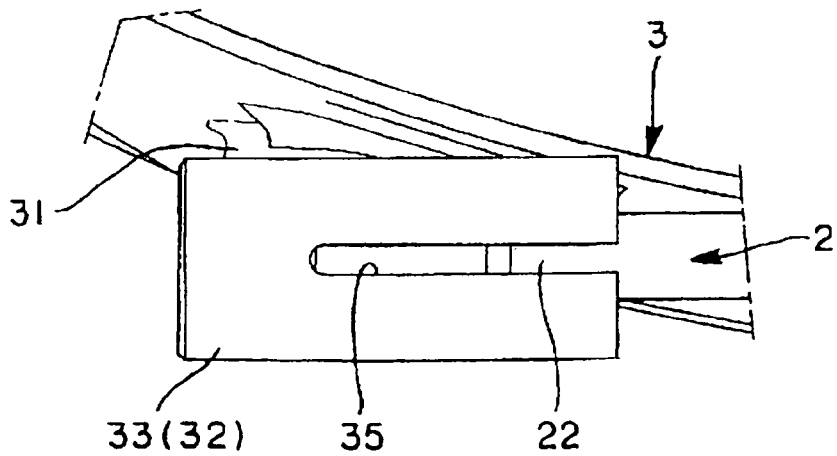
FIG. 4(c) is an enlarged view as seen along D of FIG. 4(b).

Specifically, the engaged portions 32 include a tube portion 33; a locking projection 34 provided on the inner circumference of the tube portion; and a plurality of slits 35 provided in the tube portion 33. The tube portion 33 is integrated with the circular portion 3 through the joint portion 31 with a predetermined tilt angle. In this example, this is a tilt in which an entrance of the tube portion 33 is located on the upper side than an exit. This tilt is set in view of a vehicle body-side attachment portion and the like of the other end (attachment hole 24) of the string-like member 2. As for an end surface shape of both sides of the locking projection 34, as shown in FIG. 4(a), the end surface of a tube-portion entrance side is a shelving taper portion 34a which gradually becomes lower toward the entrance side, and the end surface of a tube-portion exit side is a taper portion 34b with a relatively sharp angle. Each slit 35 allows (the locking projection 34 of) the tube portion 33 to be easily deformed in a diameter direction. As shown in FIGS. 4(b), 4(c), each slit 35 is provided in a faced state, and also formed in a length of passing through the locking projection 34 from the tube-portion entrance side. That is, each slit 35 is a groove extending from an insertion opening side which inserts the engaging portions 20, and also provided along an inserting direction of the engaging portions 20 relative to the tube portion 33.

Also, as for the above-mentioned engaged portions 32, among the engaging portions 20, the end bulging portion 21 is pressed in from the tube-portion entrance side along the shelving taper portion 34a, and when the end bulging portion 21 passes through the locking projection 34 accompanied with the deformation of an expanded diameter through each slit 35 of the tube portion 32, the tube portion 32 is restored to an original shape, so that the engaging portions 20 are engaged in a retained state, and a connected state of the string-like member 2 relative to the circular body 2 is maintained. Also, as for the engagement, if a stress in a drawing direction on the string-like member 2 reaches a predetermined value or above, the end bulging portion 21 passes through the locking projection 34 and the taper 34a accompanied with the deformation of the expanded diameter through each slit 35 of the tube portion 32, so that the engagement is released. Accordingly, the circular body 2 and the string-like member 2 are separated. That is, as for the connecting means 6, for example, due to a rear-end car accident and the like, when the vehicle body-side corresponding portion connecting one end side of the tether 1 (string-like member 2) is forcibly removed or deformed, so that the string-like member 2 tries to pull the cap 4 in an opening direction, the engagement of the engaged portions 32 and the engaging portions 20 is released by a force smaller than a force when the cap 4 rotates in the opening direction from the mounted state. Accordingly, the tether 1 is set so as to be separated into the circular body 2 and the string-like member 2.

Figure 1:
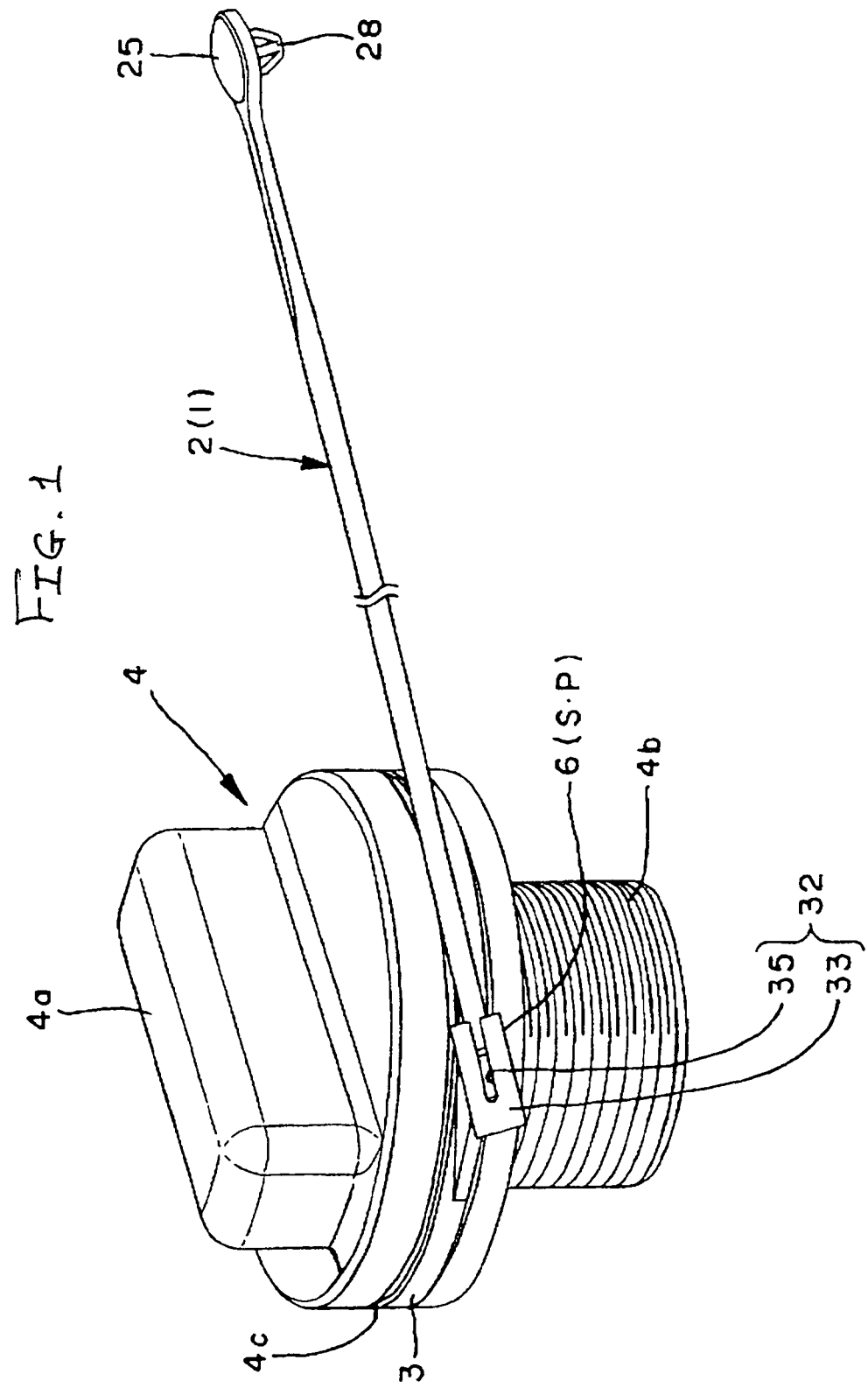
FIG. 1 is a schematic perspective view showing a state wherein a tether of an embodiment of the present invention is attached to a cap.

(Operation) The above-mentioned tether 1 is attached to, for example, a corresponding portion (the outside lid 15 or a proximity portion of the concave portion) of the vehicle body 10 in a state of FIG. 1. In this example, as shown in FIGS. 5, 6, the other end of the string-like member 2 is attached to a bracket 16 additionally provided on the inner surface of the outside lid 15 through the clip 5, and the like. In this attaching operation, the clip 25 is pressed by matching the engagement leg portion 28 with an attachment hole 17 provided on the bracket 16. Then, the other end of the string-like member 2 passes through the attachment hole 17 while the engagement leg portion 28 reducing the diameter once, and is fixed to be engaged with the attachment hole 17 by being restored after passed through. Consequently, the tether 1 can be attached to the vehicle body side through the clip 5 with a one-touch operation. However, the other end of the string-like member 2 may be attached to the outside lid 15 or near the concave portion (for example, the inside surface of the concave portion 11) by another stopper, welding, or the like, instead of the clip 25.

Also, the cap 4 is removably mounted on the vehicle body-side oil feeding port 12 by a screwing-in operation in a state attached to the outside lid 15 through the tether 1. In this operation, since the circular body 3 is relatively rotatably mounted on (the circular groove 4c) of the cap 4, even if the cap 4 is rotated by holding the operation portion 4a, the string-like member 2 does not rotate together. Thereby, as with the time without the tether 1, the cap 4 can be operated. Incidentally, it is easy to freely rotate the circular body 3 by reducing a sliding resistance to the cap 4 due to the existence of a plurality of longitudinal ribs 30. If the cap 4 is removed from the oil feeding port 12, the cap 4 is supported in a state suspended on the vehicle body side through the tether 1. Thereby, possibility of losing the cap can be eliminated.

Additionally, in this structure, due to a rear-end car accident and the like, if the outside lid 15 or the vicinity thereof among the vehicle body 10 is forcibly deformed, for example, as shown by dashed lines in FIG. 6, the outside lid 15 is additionally rotated from the open state, as described in the above, the end bulging portion 21 of the string-like member-side engaging portion passes through the locking projection 34 and the taper 34a accompanied with the deformation of the expanded diameter through each slit 35 of the tube portion 32, so that the engagement is released. Accordingly, the string-like member 2 is divided from the circular body 3. As a result, even if the cap 4 receives a load in the opening direction through the tether 1 due to a rear-end car accident and the like, the tether is divided in two, and the cap 4 and the vehicle body-side outside lid 15 are brought into the disconnected state. Also, in this structure, even if the string-like member 2 is disengaged from the circular body 3 and divided, the engaging portions 20 can be engaged with the engaged portions 32 again and the string-like member 2 can be connected to the circular body 3 in the above-mentioned manner, so that the commodity value can be improved.

MODIFIED EXAMPLES 1 and 2

FIGS. 7(a), 7(b) show two examples wherein a connection angle of the string-like member 2 relative to the above-mentioned circular body 3 is modified. Incidentally, in each modified example, the same symbols are assigned to the same members and portions as the above-mentioned embodiments, and overlapped explanations are omitted. Specifically, the structure in FIG. 7(a) is the modified example 1 wherein the string-like member 2 is connected to the circular body 3 so as to be disposed approximately in parallel with the outer circumference of the circular body. The bottom line is, compared to the above-mentioned embodiments, this is the example wherein the tube portion 33 comprising an engaged portion 32A is provided in parallel with the outer circumference of the circular body 3. For example, it is easy for the tether 1 to be combined with both types in which the oil feeding port is disposed on the left side or the right side of the vehicle body. On the other hand, compared to the above-mentioned embodiments, the structure in FIG. 7(b) is the example wherein the string-like member 2 is connected to the circular body 3 with a reverse tilt, and the tube portion 33 comprising an engaged portion 32B is jointed to the circular portion 3 with the tilt so that the entrance is positioned on the lower side of the exit. Thus, various alignments of the string-like member 2 and the circular body 3 are adoptable.

MODIFIED EXAMPLE 3

FIGS. 8(a), 8(b) show the example wherein the above-mentioned string-like member 2 and the circular body 3 are integrally formed. Incidentally, even in the modified example 3, the same symbols are assigned to the same members and portions as the above-mentioned embodiments, and overlapped explanations are omitted. Specifically, in the tether 1, the string-like member 2 and the circular body 3 are formed in an integrated manner by an injection molding die. One end of the string-like member 2 is formed in a connecting piece portion 24, and also is connected and integrated into the joint portion 31 wherein the connecting piece portion 24 is provided in the outer circumference of the circular body 3 through a breaking portion 7. The breaking portion 7 is structured so that a piece portion connecting the connecting piece portion 24 and the joint portion 31 is formed to have a thin width by slits 36, 36 on both sides, and this piece is the easiest portion to break.

Even in the above-mentioned modified example 3, due to a rear-end car accident and the like, if the outside lid 15 or the vicinity thereof among the vehicle body 10 is forcibly deformed, for example, as shown by dashed lines in FIG. 6, the outside lid 15 is additionally rotated from the open state, the string-like member 2 is cut out at the breaking portion 7 and divided from the circular body 3. As a result, even if the cap 4 receives the load in the opening direction through the tether 1 due to a rear-end car accident and the like, the tether 1 is divided in two, and the cap 4 and the vehicle body-side outside lid 15 is brought into the disconnected state.

Additionally, as another structure, instead of the modified example 3, as shown in the enlarged view of the c portion of FIG. 8(a), a breaking portion 8 for the disengagement portion formed with a thin width in the course of the string-like member 2, i.e., a portion which is the easiest portion to be cut off, may be formed. Also, as shown in the enlarged view of the d portion of FIG. 8(b), a breaking portion 9 for the disengagement portion formed with the thin width in one portion of the circular body 3, i.e., the portion which is the easiest portion to be cut off may be formed.

In the above-mentioned each structure, as mentioned above, if the cap 4 receives the load with the predetermined value or above, the cap 4 is divided into the upper side and the lower side at the vicinity (upper side of the male screw 4b) of the attachment portion of the circular body 3. At the time of this separation, the male screw 4b of the cap 4, i.e., the lower side portion remains in a state fastened to the oil feeding port 12 (filler neck). That is, as the above-mentioned structural characteristics, it is designed so that as for a pulling force applied in a cap rotational direction relative to the cap 4, the cap can be divided by the disengagement of the connecting means 6, or divided through the breaking portions 7 to 9 which combine with the disengagement portion S/P, and also, as for a pulling force applied in the cap axial direction relative to the cap 4, the cap can respond by separating itself into the upper side portion and the lower side portion.

Incidentally, details of the present invention can be variously modified as necessary provided that they include technical elements specified in claims.

Incidentally, all contents of the specification, scope of claims, figures, and abstract of Japanese Patent Application No. 2007-214990 filed on Aug. 21, 2007 are cited here and incorporated as the disclosure of the specification of the present invention.

What is claimed is:

1. A filler cap tether, comprising:
   a circular body adapted to be rotatably mounted on an outer circumference of a filler cap removably mounted on an oil feeding port,
   an elongated flexible tether having attachment portions on two ends thereof, one attachment portion being removably connected to the circular body and the other attachment portion being adapted to be connected to a vehicle body, and
   a connecting device configured to selectively disconnect the circular body from the tether when a load with a predetermined value or above is applied to the filler cap,
   wherein the connecting device includes a male element provided on the tether as an engaging portion, and an engaged portion provided on the circular body to permit mutual engagement and disengagement between the circular body and the tether, said engaged portion including a tube portion having a slit extending along an inserting direction from an insertion opening where the male element is inserted, and a first taper portion formed on an inner surface of the tube portion, said first taper portion extending along the inserting direction and becoming lower toward the insertion opening.

2. A filler cap tether according to claim 1, wherein said tether is attached to said circular body so as to tilt at an angle relative to the outer circumference of said circular body.

3. A combination comprising the filler cap tether according to claim 1, and a filler cap, wherein said filler cap separates into upper and lower portions if a load with the predetermined value or above is applied in a cap axial direction.

4. A combination according to claim 3, wherein said circular body is mounted on an upper side portion among the upper and lower portions of said filler cap.

5. A filler cap tether according to claim 1, wherein the tube portion has a second taper portion formed on the inner surface of the tube portion at a side opposite to the first taper portion and having an angle shaper than that of the first taper portion.

6. A filler cap tether according to claim 5, wherein the male element comprises an end bulging portion, an insertion control portion, and a sliding axial portion between the end bulging portion and the insertion control portion, the sliding axial portion having a diameter less than those of the end bulging portion and the insertion control portion to receive a portion between the first and second taper portions therearound.

* * * * *